United States Patent [19]

Barrett et al.

[11] Patent Number: 5,436,966
[45] Date of Patent: Jul. 25, 1995

[54] INTERFACE FOR HANDLING EVENT MESSAGES GENERATED BY TELECOMMUNICATIONS SWITCHES WITH AUTOMATIC CALL DISTRIBUTION CAPABILITY

[75] Inventors: John C. Barrett, Elburn; Eugene Gerber, Bolingbrook; Mary R. Otto, Lisle; Wayne A. Senneke, Aurora, all of Ill.

[73] Assignee: AT&T Corp., Murray Hill, N.J.

[21] Appl. No.: 239,091

[22] Filed: May 5, 1994

[51] Int. Cl.⁶ ............................................. H04M 3/54
[52] U.S. Cl. ................................. 379/265; 379/201; 379/207
[58] Field of Search ................ 379/265, 266, 214, 67, 379/88, 89, 201, 212, 210

[56] References Cited

U.S. PATENT DOCUMENTS

| | | | |
|---|---|---|---|
| 4,449,017 | 5/1984 | Burke et al. | 379/373 |
| 4,510,351 | 4/1985 | Costello et al. | 379/34 |
| 4,757,529 | 7/1988 | Glapa et al. | 379/266 |
| 4,942,602 | 7/1990 | Baker, Jr. et al. | 379/212 |
| 4,943,996 | 7/1990 | Baker, Jr. et al. | 379/210 |
| 5,073,890 | 12/1991 | Danielsen | 370/58.2 |
| 5,153,909 | 10/1992 | Beckle et al. | 379/265 |
| 5,164,983 | 11/1992 | Brown et al. | 379/265 |
| 5,185,782 | 2/1993 | Srinivasan | 379/67 |
| 5,206,903 | 4/1993 | Kohler et al. | 379/309 |
| 5,299,259 | 3/1994 | Otto | 379/212 |
| 5,311,574 | 5/1994 | Livanos | 379/88 |
| 5,327,488 | 7/1994 | Garland | 379/201 |
| 5,329,583 | 7/1994 | Jurgensen et al. | 379/266 |

Primary Examiner—James L. Dwyer
Assistant Examiner—Scott Wolinsky
Attorney, Agent, or Firm—Charles L. Warren

[57] ABSTRACT

An automatic call distribution (ACD) interface unit (AIU) which receives event messages generated by different telecommunication switches and forwards corresponding event messages to management of information system (MIS) processors. The AIU insures the uniqueness of identification codes by substituting a modified identification code when event messages destined for a single MIS processor are generated by two or more telecommunication switches.

16 Claims, 4 Drawing Sheets

| | 78A | 80A | 82A | 84A | |
|76A|---|---|---|---|---|
| | | QUEUE NO. | TEAM NO. | AGENT NO. | |

(PRIOR ART)

FIG. 4

| | 78B | 80B | 82B | 84B | 86 |
|76B|---|---|---|---|---|
| | | QUEUE NO. | TEAM NO. | AGENT NO. | SWITCH ID NO. |

FIG. 5

| | 90 | 92 | 94 | 96 |
|88|---|---|---|---|
| | | AIU CONTROLLED QUEUE NO. | AIU CONTROLLED TEAM NO. | AIU CONTROLLED AGENT NO. | |

FIG. 6

INTERFACE FOR HANDLING EVENT MESSAGES GENERATED BY TELECOMMUNICATIONS SWITCHES WITH AUTOMATIC CALL DISTRIBUTION CAPABILITY

BACKGROUND OF THE INVENTION

This invention is generally directed to automatic call distribution (ACD) systems which support management of information system (MIS) devices. Event messages sent from telecommunication switches are received and processed by the MIS devices to provide statistical data concerning the operation of the ACD system and the performance of agents who handle ACD calls. This invention more specifically addresses an interface apparatus and corresponding method that handles event messages generated by a plurality of telecommunication switches.

A company which has a high traffic calling volume may utilize an ACD system implemented by a telecommunication switch to more efficiently handle incoming calls. For example, an airline may utilize teams or groups of ACD agents to handle incoming calls concerning reservations and customer assistance. Depending on the volume of calls and the location of agents handling the incoming calls, two or more telecommunication switches may simultaneously serve different agent teams of the same company. FIG. 1 illustrates an example of such a system. Central office switch 10 in this illustrative example supports ACD customers A1 and B1. Central office switch 12 supports ACD customers A2 and C1. In this example, customers A1 and A2 represent two different teams of ACD agents which handle calls made to company A. Customers B1 and C1 represent a team of agents which handle calls for companies B and C, respectively. Communication channels 14 and 16 carry messages generated by switches 10 and 12, respectively, to an ACD interface unit (AIU) 18. The AIU 18 functions as a multiplexing unit which routes messages generated by the switches to an appropriate one of the MIS processors 20, 22, 24, and 26 which support ACD teams A1, A2, B1, C1, respectively. It is important to note that each of the MIS processors support ACD teams associated with only one switch. In the illustrative example, the central office switches may comprise an AT&T 5ESS ® switch with the Pinnacle ACD option; the AIU 18 may comprise an AT&T Pinnacle ACD interface unit; the MIS processors 20-26 may comprise Pinnacle MIS processors available from AT&T.

Since each telecommunication switch operates independent of other switches with regard to the assignment of identification parameters for each ACD agent, it is possible that the same identification parameters will have been assigned to different agents supported by two different switches. This problem has been addressed by requiring separate MIS processors to support each switch. Thus, a single MIS processor cannot support the processing of event codes for agents associated with different switches.

If company A desires to have a consolidated statistical report concerning the activities of agents on teams A1 and A2, a separate communication channel 28 must be provided between MIS processors 20 and 22 to couple the statistical data collected for the two ACD agent teams. The need to link separate MIS processors adds complexities for customers such as company A which may desire to have consolidated statistics for all of its ACD agents in teams A1 and A2. Further, companies which may require only a small number of geographically separated agents served by different switches, are required to incur costs associated with MIS processors for each of the groups of its agents associated with different switches. Thus, there exists a need for an improved way for handling ACD event messages so that a single MIS processor can be utilized to process the event messages for all ACD teams of a company event where the teams are supported by different switches.

SUMMARY OF THE INVENTION

An object of the present invention is to provide improved handling of ACD event messages generated by telecommunication switches to allow a single MIS processor to be able to receive and calculate statistical data for ACD agents supported by different switches.

In accordance with an embodiment of the present invention, an improved AIU is utilized to receive and process event messages generated by a plurality of telecommunication switches among a plurality of MIS processors. The AIU receives first event messages which include first agent identification parameters from the switches. The AIU identifies the switch which sent the messages. The AIU then selects the ones of the first event messages that have agent identification parameters which do not uniquely identify an agent, i.e. event messages to be sent to an MIS processor that receives event messages from more than one switch. The AIU generates second event messages corresponding to the ones of the first event messages wherein the second event messages contain second agent identification parameters which are based on the first agent identification parameters. The second agent identification parameters uniquely identify each associated agent. The AIU transmits the second event messages to the MIS device assigned to collect messages for the agents associated with the corresponding first event messages.

BRIEF DESCRIPTION OF THE DRAWINGS

FIG. 4 illustrates a known protocol for event messages.

FIG. 5 illustrates a protocol in accordance with one embodiment of the present invention for the transmission of event messages from the originating switch to the AIU.

FIG. 6 illustrates a protocol in accordance with the present invention illustrating the transmission of modified ACD event messages from the AIU to MIS processors.

DETAILED DESCRIPTION

Figure 1:
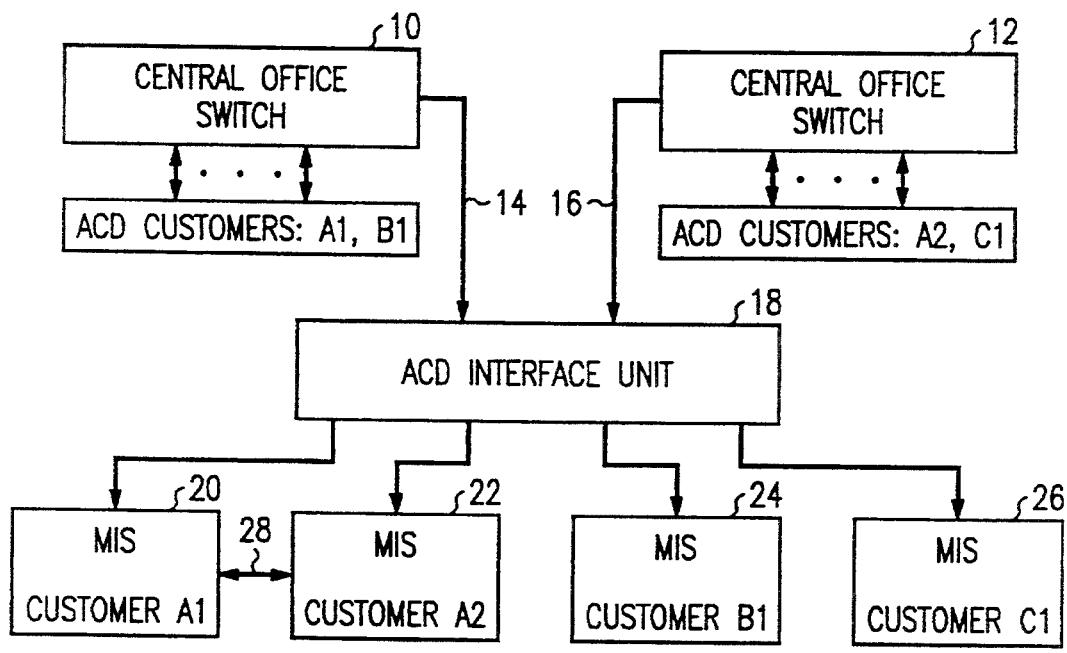
FIG. 1 is a block diagram of a known implementation of an ACD system.
Figure 2:
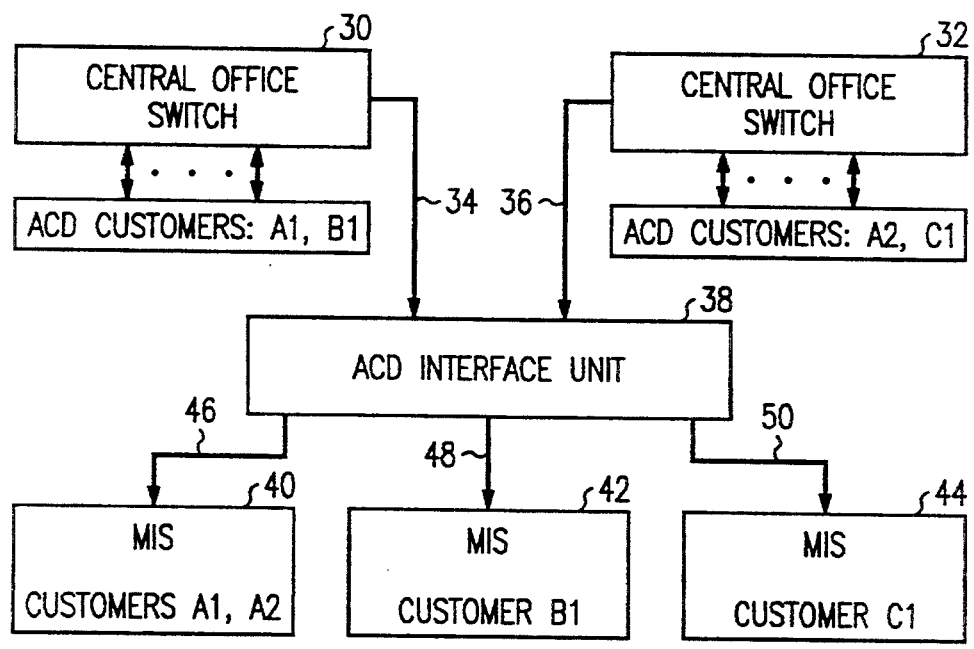
FIG. 2 is a block diagram of an ACD system in accordance with the present invention which provides improved routing of ACD event messages.

FIG. 2 illustrates a diagram of an exemplary ACD system in accordance with the present invention including central office switch 30 which supports ACD customers A1 and B1. Central office switch 32 supports ACD customers A2 and C1. Customers A1 and A2 consist of separate teams of agents which provide call processing services on behalf of a single company A. The central office switches 30 and 32 may comprise an AT&T 5ESS switch with the Pinnacle ACD option. Communication channels 34 and 36 carry event messages generated by switches 30 and 32, respectively, which convey information relating to the processing of calls by the ACD facility. In accordance with the present invention, the illustrative AIU 38 receives the event messages on channels 34 and 36, processes the received event messages, and transmits corresponding event messages to MIS processors 40, 42, and 44 by communication channels 46, 48, and 50, respectively. The MIS processors may comprise processors available from AT&T which support the Pinnacle ACD systems. MIS processor 40 receives event messages relating to ACD customers A1 supported by central office switch 30 and ACD customers A2 supported by central office switch 32. This permits the MIS processor 40 to derive statistical information based on the information provided by the event messages related to both customer teams A1 and A2. This allows company A to use a single processor to derive statistical information based on the event message information without requiring an interim transfer of a portion of the information from another MIS processor. In the illustrative example, MIS processors 42 and 44 support customers B1 and C1, respectively.

The AIU 38 in accordance with the present invention provides an intelligent event message processing capability which permits processed event messages associated with ACD agents served by different central office switches to be routed to a single MIS processor. The assignment of identification parameters for call holding queues, teams, and ACD agents is handled at a central office switch independent of such assignments made at other switches. Thus, for example, an agent associated with switch 32 could be assigned an identification code which is the same as an identification code assigned a different agent associated with switch 30. An important aspect of the present invention resides in the ability to generate modified event messages with unique identification codes even when duplicate identification parameters are assigned by switches 30 and 32. Illustrative solutions provided in accordance with the present invention are explained below.

Figure 3:
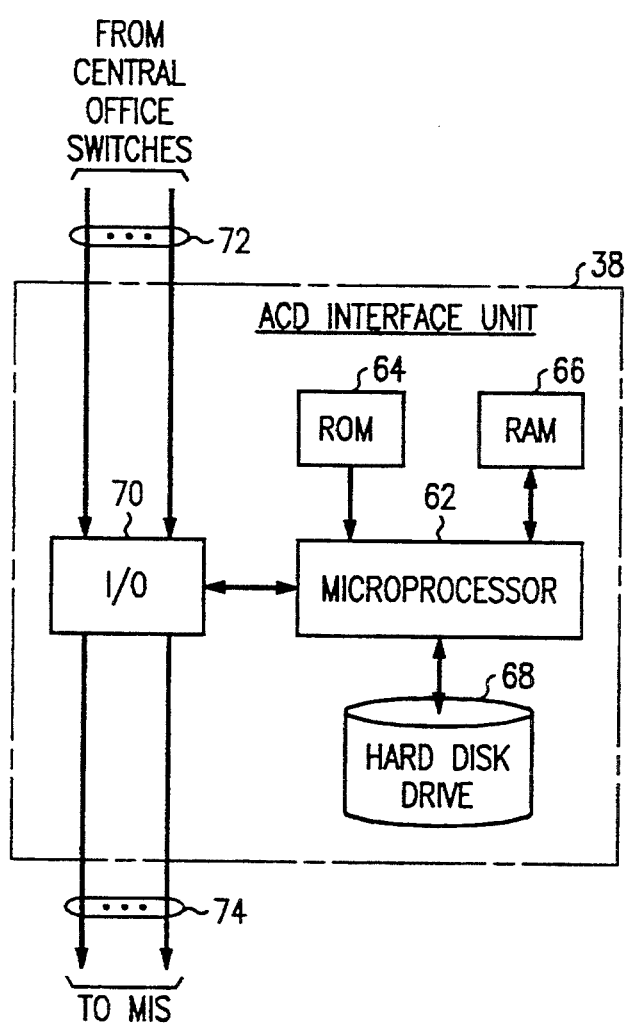
FIG. 3 is a block diagram of an exemplary embodiment of an ACD interface unit as shown in FIG. 2.

FIG. 3 illustrates a block diagram of an ACD interface unit 38 as shown in FIG. 2 in accordance with an embodiment of the present invention. The AIU 38 includes a microprocessor 62 which functions in association with read-only memory (ROM) 64, random access memory (RAM) 66, and a data storage device 68 which may comprise a hard disk drive. An input/output peripheral device 70 provides incoming and outgoing communication support for microprocessor 62. Event messages received over communication channels 72 from respective central office switches are received by device 70 and communicated to microprocessor 62. The microprocessor 62 processes the received event message and either retransmits the received event message or generates a modified event message which is transmitted by device 70 by one of communication channels 74 to a destination MIS processor.

FIG. 4 illustrates an exemplary format utilized by switches in the prior art to transmit event messages. An event message 76A may include a plurality of fields 78A which contain information relating to calls and actions associated with the ACD system. Fields 80A, 82A, and 84A contain a queue identification number, an ACD team identification number, and an ACD agent identification number, respectively. This information enables the destination MIS processor to correlate the ACD information contained in other fields with a particular queue, team, and/or agent.

FIG. 5 illustrates an exemplary event message format 76B which is similar to the message format 76A. The message 76B includes fields 78B which contain information related to the ACD system and fields 80B, 82B, and 84B which contain queue, team, and agent identification numbers. This message format contains a switch identification number 86 which uniquely identifies the central office switch which originated the event message. In accordance with an embodiment of the present invention, the central office switches will generate the unique switch identification number 86 for each event message transmitted to the AIU 38. The switch identification number is utilized by the AIU to differentiate messages sent by different switches which may have duplicate queue, team, or agent identification numbers.

In an alternative embodiment in accordance with the present invention, AIU 38 uniquely identifies the central office switch which has sent an event message by associating the transmission channel 34, 36 which carried the event message. This association is possible since separate predetermined communication channels are utilized to carry an event message to the AIU 38 from each central office switch. Thus, event messages arriving on a particular communication channel will have been sent from a particular central office switch. Thus, this capability provides an alternative way for the AIU 38 to identify the central office switch which originated a given event message.

FIG. 6 illustrates an exemplary format 88 utilized by an AIU 38 in accordance with the present invention to transmit an event message to the appropriate MIS processor based on a corresponding event message received from a central office switch. A plurality of fields 90 carry substantive information relating to the A CD facility. Fields 92, 94, and 96 carry AIU controlled queue number, AIU controlled team number, and AIU controlled agent number, respectively. In accordance with one embodiment of the present invention, the AIU controlled numbers in fields 92, 94, and 96 contain the same information contained in fields 80, 82, and 84 if there is not a possibility for a duplicate number, i.e. where a MIS processor does not receive messages from more than one central office switch. However, the AIU generates different AIU controlled fields 92, 94, and 96 where the possibility of duplication exists, i.e. where an MIS processor receives event messages from more than one central office switch.

In an alternative embodiment in accordance with the present invention, the AIU generates AIU controlled fields 92, 94, and 96 for each event message in order to insure uniqueness of the identification information. This embodiment has the advantage that a determination need not be made as to whether an MIS processor receives event messages from more than one switch. However, this embodiment has the disadvantage that each of the event messages must be processed to generate a unique modified queue, team, and agent field information. A further explanation of the embodiments in accordance with the present invention is provided below.

Figure 7:
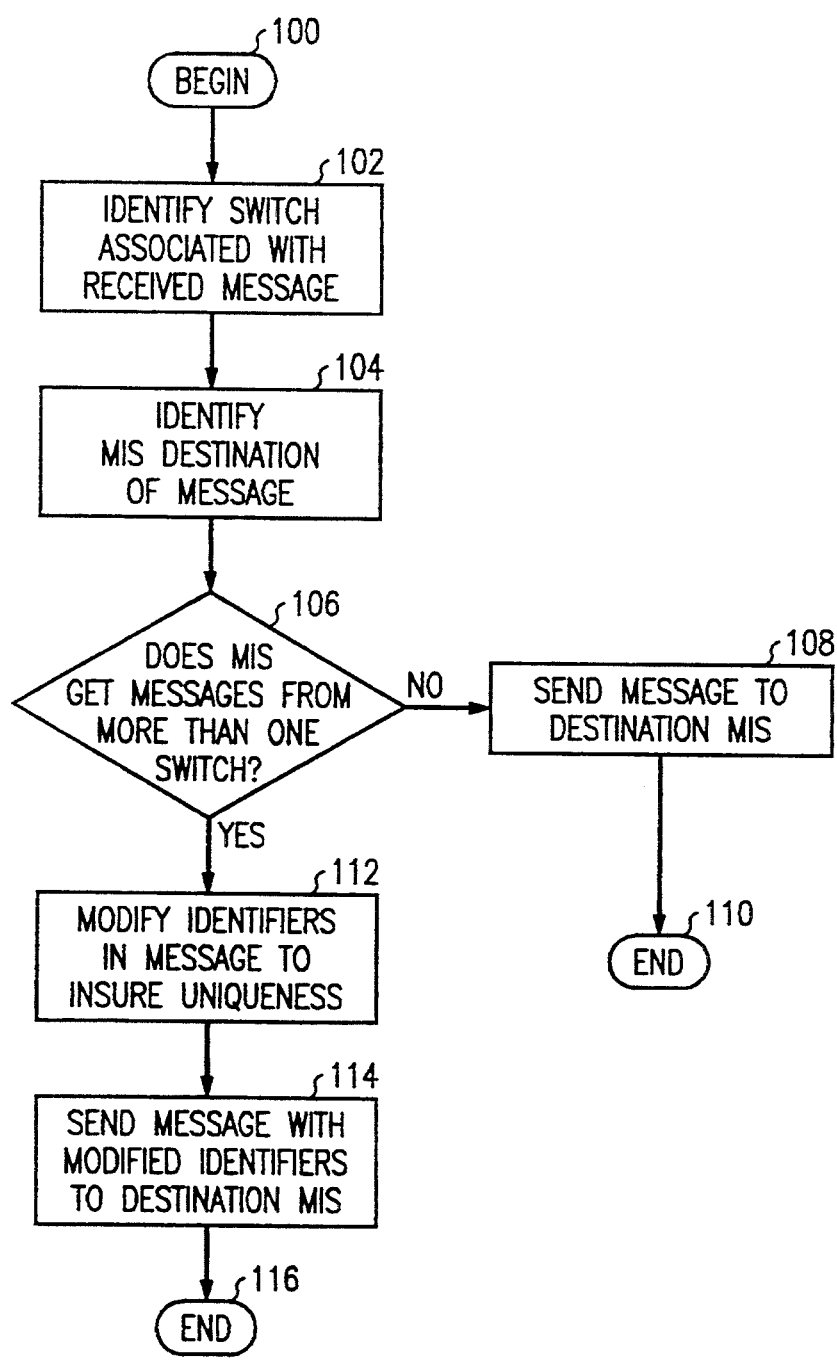
FIG. 7 is a flow diagram illustrating the steps of an illustrative embodiment of a method of the present invention for handling event messages.

FIG. 7 illustrates a flow diagram illustrating steps in accordance with an embodiment of the present invention as performed by an AIU 38. Starting at BEGIN step 100, the AIU identifies the switch associated with the received event message in accordance with step 102. As explained above, identification of the originating central office switch may occur by the receipt of a switch identification number as part of the event message as represented in FIG. 5. Alternatively, the originating switch may be identified by associating each received message with the communication channel upon which it was received by the AIU. For example, an address assigned by AIU 38 for each incoming communication channel can be associated with each event message received on the corresponding communication channel in order to identify the communication channel and hence, the central office switch which originated the event message. The association of such a channel address to a corresponding switch may be stored in a look-up table in data storage device 68.

In step 104 the MIS processor is identified which will be the destination of a received event message. A table in a database contained in data storage device 68 in the AIU contains information concerning each MIS processor and identifies which or customer's event messages are to be handled by each MIS processor. Similarly, the database contains a table that correlates the customers supported by each MIS processor and the queue, team, and agent identification numbers associated with each customer so that each received event message can be associated with a particular customer and hence, to a corresponding MIS processor.

In step 106 a determination is made of whether a MIS processor receives messages from more than one central office switch. This predetermined information will be stored in the MIS database table stored by the AIU. A NO determination such as would be made-for customers B1 and C1, as illustrated in FIG. 2, results in the received unmodified event messages being sent to the identified MIS processor 42 or 44 as indicated by step 108. Following this routing of a received event message, the process terminates at END step 110.

Assuming that a YES determination is made by step 106, such as where an event message is associated with one of customers A1 and A2, the AIU modifies the identifiers in the event message as indicated by step 112. The AIU generates controlled fields 92, 94, and 96 to insure that each field uniquely identifies a corresponding queue, team, and/or agent since the possibility of a duplication exists since the MIS processor receives event messages originated from two central office switches. Thus, event messages associated with customers A1 and A2, which are supported by central office switches 30 and 32, respectively, are processed in accordance with this embodiment of the present invention by modifying the received queue, team, and/or agent number fields to contain modified queue, team, and agent number identifications. This may be accomplished by microprocessor 62 utilizing a database stored in storage device 68 which contains predetermined unique identification number assignments associated with each of the possible queue, team, and agent numbers. For example, if agent identification numbers between 1 and 999 are permitted by the switches, the database contained in storage device 68 may contain a translation table which correlates each assigned agent number for each switch to a different number. In the illustrative example, AIU 38 can generate modified identification numbers to uniquely identify the corresponding parameters generated by each central office switch such as by adding an additional leading digit uniquely associated with each switch, such as a "1" for switch 30 and a "2" for switch 32. Thus, if agents of customer A1 associated with switch 30 have assigned numbers of 20, 21, 22, and 23 and agents of customers A2 associated with switch 32 have assigned numbers of 22, 23, 24, and 25, the AIU unit will translate the received agent identification numbers resulting in agent numbers 20–23 being mapped to the sequence 1020, 1021, 1022, and 1023, and 22–25 being mapped to 2022, 2023, 2024, and 2025. Thus, MIS processor 40 is insured of receiving unique identification numbers for each agent even where duplicate agent numbers have been initially assigned by two different central office switches. The same translating technique can be utilized to uniquely identify queues and teams as well.

In step 114 the event message containing modified identifiers generated by the AIU is sent to the destination MIS processor. Since the database stored in AIU 38 identifies each agent with an associated customer and since the database also contains an identification of which MIS processor supports which of the customers, the AIU thereby identifies which of the communication channels 46, 48, and 50 to utilize in sending out the modified event message. Following the transmission of the modified message, the process terminates at END step 116.

In the illustrative embodiment explained above with regard to FIG. 7, only those messages destined for an MIS processor which received messages from more than one switch received modification of the identification parameters. Messages destined for an MIS processor that receives messages from only one switch were transmitted with the original identification fields 80, 82, and 84 since a possibility for duplication of identification numbers was not a problem. This technique has the advantage that only those messages which require modification to insure uniqueness are modified. This also minimizes the cumulative time needed to transmit a series of event messages since those messages transmitted with their original identification numbers which will have fewer digits or bytes that the modified messages which contain additional identifying information.

An alternative embodiment of a method in accordance with the present invention can also be utilized to insure an unambiguous identification of the source of event messages sent from different switches. This alternative embodiment operates similarly to that described in FIG. 7 except that steps 106, 108, and 110 are omitted and step 112 directly follows step 104. Thus, in this alternative embodiment all event messages are modified to have AIU generated fields 92, 94, and 96. A database contained in storage device 68 of AIU 38 contains a table for each switch supported by the AIU which identifies an appropriate and unique translation by which the queue, team, and agent identifications received from a switch is mapped into an AIU generated queue, team, and agent identification number (92, 94, 96) which is transmitted to the destination MIS processor. Utilizing this technique for all messages provides the advantage that the same type of identification fields are used for all event messages so that the MIS processor does not have to process unmodified and modified messages, i.e. different types of identification number as is the case with regard to the previously described method.

The exemplary embodiments in accordance with the present invention achieve the fundamental objective of permitting a single MIS processor to unambiguously receive ACD event messages generated by a plurality of switches. This permits the single MIS processor to be able to generate statistical data based on all agents and teams of a customer without requiring the assistance of or routing through another MIS processor. This provides economies for the customer since only a single MIS processor is required to generate statistics for all agents of the company regardless of whether agents are supported by multiple central office switches.

Although embodiments of the present invention have been shown in the drawings and described above, the scope of the invention is defined by the claims which follow.

We claim:

1. An apparatus for processing and distributing event messages generated by a plurality of telecommunication switches with automatic call distribution (ACD) capability among a plurality of management of information system (MIS) devices comprising:
   means for receiving first event messages from said switches, said first event messages including first ACD agent identification parameters;
   means for identifying the switch which sent each of said first event messages;
   means responsive to said receiving means and said identifying means for selecting ones of said first event messages that are to be sent to an MIS device that receives event messages from more than one of said telecommunication switches;
   means responsive to said selecting means for generating second event messages corresponding to said selected ones of said first event messages, each of said second event messages containing second ACD agent identification parameters based on said first ACD agent identification parameters contained in the corresponding selected ones of said first event messages, said second ACD agent identification parameters uniquely identifying a specific ACD agent;
   means for transmitting each second event message to one of said MIS devices that collects event messages related to the ACD agent associated with said second event message, whereby each of said second event messages uniquely identifies a specific ACD agent.

2. The apparatus according to claim 1 further comprising means for transmitting each of the first event messages not selected by said selecting means to the MIS device that collects messages related to the ACD agent associated with the corresponding first event message.

3. The apparatus according to claim 1 wherein a customer has first and second teams of ACD agents serviced by first and second of said telecommunication switches, respectively, and wherein a single MIS device collects data based on event messages associated with said first and second teams, said transmitting means transmitting each of said second event messages associated with an agent of said first and second teams to said single MIS device, thereby permitting statistical data associated with each agent on the first and second teams to be deduced from said corresponding second event messages collected at the single MIS device.

4. The apparatus according to claim 3 further comprising means for transmitting each of the first event messages, associated with an agent on said first and second teams and not selected by said selecting means, to said single MIS device, thereby permitting all data associated with each agent on the first and second teams to be collected at the single MIS device.

5. The apparatus according to claim 1 wherein each telecommunication switch includes means for assigning identification parameters to each agent serviced by the switch independent of identification parameters assigned to agents serviced by other of said telecommunication switches, whereby duplicate identification parameters can be assigned to different agents serviced by different switches.

6. A method for processing and distributing event messages generated by a plurality of telecommunication switches with automatic call distribution (ACD) capability among a plurality of management of information systems (MIS) devices comprising the steps of:
   receiving first event messages from said switches, said first event messages including first ACD agent identification parameters;
   identifying the switch which sent each of said first event messages;
   selecting ones of said first event messages that are to be sent to an MIS device that receives event messages from more than one of said telecommunication switches;
   generating second event messages corresponding to said selected ones of said first event messages, each of said second event messages containing second ACD agent identification parameters based on said first ACD agent identification parameters contained in the corresponding selected ones of said first event messages, said second ACD agent identification parameters uniquely identifying a specific ACD agent;
   transmitting each second event message to one of said MIS devices that collects event messages related to the ACD agent associated with said second event message, whereby each of said second event messages uniquely identifies a specific ACD agent.

7. The method according to claim 6 further comprising the step of transmitting each of the first event messages not selected by said selecting step to the MIS device that collects messages related to the agent associated with the corresponding first event message.

8. The method according to claim 6 wherein a customer has first and second teams of ACD agents serviced by first and second of said telecommunication switches, respectively, and wherein a single MIS device collects data based on event messages associated with said first and second teams, said transmitting step transmitting each of said second event messages associated with an agent of said first and second teams to said single MIS device, thereby permitting statistical data associated with each agent on the first and second teams to be deduced from said corresponding second event messages collected at the single MIS device.

9. The method according to claim 8 further comprising the step of transmitting each of the first event messages, associated with an agent on said first and second teams and not selected by said selecting step, to said single MIS device, thereby permitting all data associated with each agent on the first and second teams to be collected at the single MIS device.

10. The method according to claim 6 wherein each telecommunication switch allows identification parameters to be assigned to each agent serviced by the switch independent of identification parameters assigned to agents serviced by other of said telecommunication switches, whereby duplicate identification parameters can be assigned to different agents serviced by different switches.

11. An apparatus for handling event messages generated by a plurality of telecommunication switches with automatic call distribution (ACD) capability, each message containing information associated with an ACD agent serviced by said switches, the apparatus comprising:
   means for receiving first event messages generated by said switches, each of said first event messages including first identification parameters associated with one of said agents;
   means responsive to said receiving means for generating second event messages corresponding to said first event messages, each of said second event messages containing second identification parameters based on the first identification parameters contained in the corresponding first event message, said second identification parameters uniquely identifying a specific agent;
   means for transmitting each second event message to management of information systems (MIS) devices that collects messages related to the agent associated with said second event message, whereby each of said second event messages sent to an MIS device uniquely identifies a specific agent.

12. The apparatus according to claim 11 wherein a customer has first and second teams of ACD agents serviced by first and second of said telecommunication switches, respectively, and wherein a single MIS device collects data based on event messages associated with said first and second teams, said transmitting means transmitting each of said second event messages associated with an agent of said first and second teams to said single MIS device, thereby permitting data to be collected for each agent on the first and second teams based on said second event messages sent to the single MIS device.

13. The apparatus according to claim 11 wherein each telecommunication switch includes means for assigning identification parameters to each agent serviced by the switch independent of identification parameters assigned to agents serviced by other of said telecommunication switches, whereby duplicate identification parameters can be assigned to different agents serviced by different switches.

14. A method for handling messages generated by a plurality of telecommunication switches with automatic call distribution (ACD) capability, each message containing information associated with an ACD agent serviced by the switches, the method comprising the steps of:
   receiving first event messages generated by said switches, each of said first event messages including first identification parameters associated with one of said agents;
   responsive to said receiving steps, generating second event messages corresponding to said first event messages, each of said second event messages containing second identification parameters based on the first identification parameters contained in the corresponding first event message, said second identification parameters uniquely identifying a specific agent;
   transmitting each second event message to management of information systems (MIS) that collects messages related to the agent associated with said second event message, whereby each of said second event messages sent to an MIS device uniquely identifies a specific agent.

15. The method according to claim 14 wherein a customer has first and second teams of ACD agents serviced by first and second of said telecommunication switches, respectively, and wherein a single MIS device collects data based on event messages associated with said first and second teams, said transmitting step transmitting each of said second event messages associated with an agent of said first and second teams to said single MIS device, thereby permitting data collected for each agent on the first and second teams based on said second event messages sent to the single MIS device.

16. The method according to claim 14 wherein each telecommunication switch includes permitting the assigning of identification parameters to each agent serviced by the switch independent of identification parameters assigned to agents serviced by other of said telecommunication switches, whereby duplicate identification parameters can be assigned to different agents serviced by different switches.

* * * * *